Patented July 21, 1942

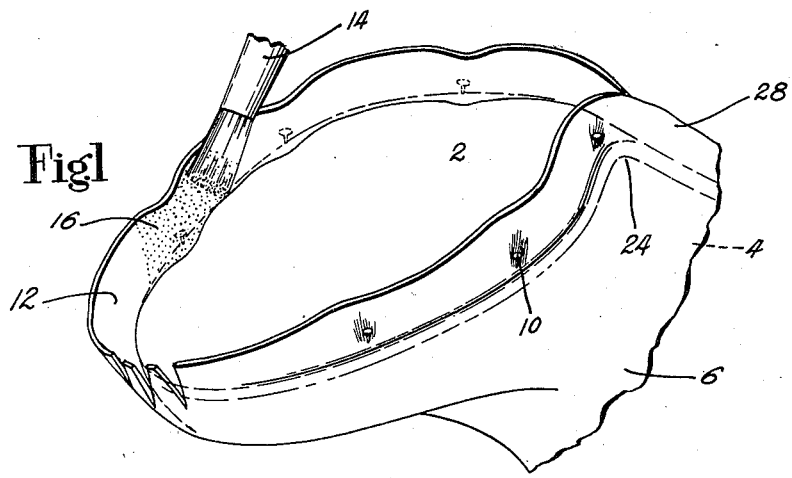
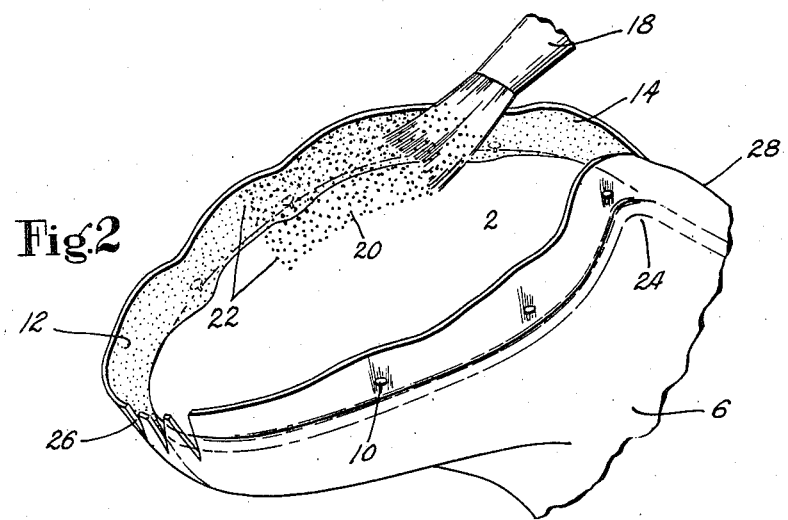
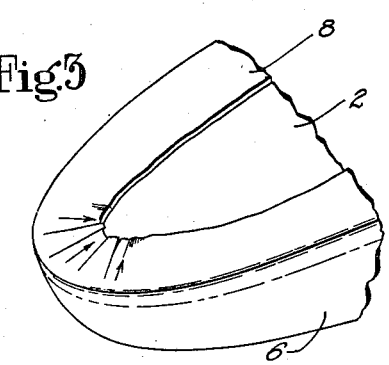

2,290,204

UNITED STATES PATENT OFFICE 2,290,204

SHOE AND METHOD OF LASTING

Frederick V. Nugent, Abington, Mass., assignor to B. B. Chemical Co., Boston, Mass., a corporation of Massachusetts Application July 11, 1941, Serial No. 401,924

5 Claims. (Cl. 12—145)

This invention relates to shoe manufacture, and more particularly to the lasting to an insole of a shoe upper having a lasting marginal portion composed of vinyl resin.

Vinyl resin sheet material exhibits attractive possibilities as shoe upper material, but its utilization has involved shoemaking difficulties. Thus, in attempting to last the overlasted marginal portions of vinyl resin uppers to insoles by means of the usual commercial lasting cements, satisfactory adhesion has not been obtained.

An object of this invention is to provide an advantageous method of lasting an upper having a lasting marginal portion composed of vinyl resin. A further object is to provide a shoe construction wherein a shoe upper having a lasting marginal portion composed of vinyl resin may be securely and adhesively lasted to an insole.

In the accomplishment of the above and other objects, I have found that a shoe upper having a lasting marginal portion composed of vinyl resin may be adhesively lasted to an insole by securing a film of chlorinated rubber to the inner surface of the overlasted marginal portion of the upper, and securing said marginal portion to said insole by means of a lasting cement the adhesive constituent of which is from the group consisting of rubber and polymerized chloroprene. The chlorinated rubber film preferably is secured to the inner surface of the overlasted marginal portion of the upper by applying thereto a solution of chlorinated rubber, and permitting said solution to dry. The upper then may be adhesively lasted to the insole by applying to the dried chlorinated rubber on said inner surface of the overlasted marginal portion of said upper and to the adjacent lasting marginal portion of the insole a lasting cement the primary adhesive constituent of which is from the group consisting of rubber and polymerized chloroprene. Said marginal portion of the upper is then pressed to the marginal portion of the insole with their lasting cement-coated surfaces in juxtaposition.

By the present invention a strong attachment of upper having a lasting marginal portion composed of vinyl resin to an insole may be obtained adhesively.

In the drawing illustrating a specific embodiment of the invention,

Figure 1 is a fragmentary perspective view showing a shoe upper having a lasting marginal portion composed of vinyl resin held in shaped position to the last and secured to the insole, and illustrating the application of a solution of chlorinated rubber to the inner surface of the overlasted marginal portion of said upper;

Fig. 2 is a fragmentary perspective view similar to Fig. 1 showing a film of chlorinated rubber secured to the inner surface of the overlasted marginal portion of said upper, and illustrating the application of a lasting cement to the chlorinated rubber film and to the adjacent lasting marginal portion of the insole; and Fig. 3 is a fragmentary perspective view showing the lasted toe portion of the shoe.

The shoe upper contemplated by this invention has a lasting marginal portion composed of vinyl resin. The nonoverlasted portion may consist entirely of vinyl resin or may consist in part of other materials. The vinyl resin may comprise polyvinyl acetate, polyvinyl chloride, a copolymer of vinyl acetate and vinyl chloride, polyvinyl acetal or other suitable vinyl resin. The vinyl resin ordinarily contains a suitable plasticizer such as dibutyl sellosolve phthalate, or dibutyl sebacate. The insole contemplated by this invention ordinarily is of leather but it may consist of any other material suitable for the purpose.

A preferred form of chlorinated rubber for use in this invention is that containing about 67% of chlorine and marketed under the trade name "Tornesit" by the Hercules Powder Company, Wilmington, Delaware. For the purposes of this invention the chlorinated rubber may be employed in the form of a solution of Tornesit in a solvent therefor. A suitable solution is one containing 15 to 20% by weight of Tornesit dissolved in a solvent composed of equal parts of methyl ethyl ketone and toluene. The Tornesit itself may have a viscosity characteristic of from 7 to 1000 centipoises. Alternatively, the chlorinated rubber solution may contain other dissolved material such as vinyl resin and in such case the solution may contain about 10% by weight of Tornesit together with 10% by weight of low molecular weight vinyl resin all dissolved in equal parts of methyl ethyl ketone and toluene.

The polymerized chloroprene employed for the purposes of this invention is chloroprene (also known as chloro-2-butadiene 1,3) which has been partially polymerized and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic and in which condition it resembles vulcanized rubber.

This "curing" is probably a further polymerization of the partially polymerized chloroprene to a substantially fully polymerized condition rather than the addition of sulphur to the polymer such as is considered to occur in the vulcanization of rubber.

The polymerized chloroprene dispersions or colloidal solutions employed for the purposes of this invention may vary widely in composition but one which I have found very satisfactory is that disclosed in Macdonald Patent 2,163,609 and which is as follows:

| | Grams |
|---|---|
| Plastic polymerized chloroprene (containing 2% phenyl-beta-naphthylamine) | 900 |
| Wood rosin (FF) | 45 |
| Magnesium oxide (light calcined) | 90 |
| Zinc oxide | 45 |
| Phenyl-beta-naphthylamine (stabilizer) | 9 |
| Benzene | 1,690 |
| Trichlorethylene | 2,850 |
| Sulphur | 27 |
| Du Pont accelerator #808 (butyraldehyde aniline condensation product) | 12 |

The rubber cement employed in carrying out this invention preferably contains a tackiness-augmenting ingredient such as a resin. A suitable resin for this purpose is that known commercially as "Durez 5117," and manufactured by General Plastics, Inc., North Tonawanda, N. Y. "Durez 5117" is a product prepared by treating rubber with phenol and sulphuric acid. A suitable rubber cement for the purposes of this invention is as follows:

| | Grams |
|---|---|
| Crepe rubber | 375 |
| "Durez 5117" | 125 |
| Naphtha | 2,670 |
| Ethyl alcohol | 30 |
| "Solvesso #1" (naphtha fraction) | 100 |
| Total | 3,300 |

A specific example of a preferred manner of carrying out this invention is as follows:

There is provided an insole 2 which has been secured to a last 4. There is illustrated a vinyl resin shoe upper 6 having a lasting marginal portion 8 composed of vinyl resin. The upper 6 is shaped to the last 4 and is temporarily secured to the insole 2 by the partially driven tacks 10.

The overlasted marginal portion 8 is then raised so as to expose the inner surface 12 thereof. Said inner surface 12 need not be roughed or otherwise prepared. A chlorinated rubber solution such as described above is then applied to the inner surface 12 by a brush 14 or other suitable means. This chlorinated rubber solution is permitted to dry in the atmosphere for about an hour whereby there is deposited upon the inner surface 12 of the vinyl resin marginal portion 8 a continuous film 16 of chlorinated rubber.

Following the securing of the film of chlorinated rubber 16 to the inner surface 12 of the marginal portion 8 a liquid dispersion or colloidal solution of lasting cement of the type described hereinabove is applied by brush 18 or other suitable means to the dried chlorinated rubber film 16 on the inner surface 12 and to the adjacent lasting marginal portion 20 of the insole 2. Conveniently, the lasting cement 22 is permitted to dry for about an hour.

The tacks 10 are removed and the marginal portion 8 of the upper is then pressed to the marginal portion 20 of the insole 2 with the lasting cement-coated surfaces in juxtaposition. This is conveniently accomplished by starting at the ball line 24 and progressively pulling the marginal portion 8 over with lasting pliers and hammering the overlasted margin 8 down on the cement-coated marginal portion 20 of the insole 2 and repeating this operation progressively from the ball line toward the toe of the shoe.

In order to prevent bunching at the toe, the toe portion of the marginal portion 8 is preferably pinked, as indicated at 26. The toe portion likewise may be pulled over with lasting pliers and hammered into place on the cemented marginal portion 20 of the insole.

Wrinkles in the overlasted margin 8 adjacent to the toe of the shoe may be removed in any suitable manner such as by applying a warm iron in the direction indicated by the arrows in Fig. 3.

The shank portion 28 of the shoe upper may be lasted in any suitable manner such as by the procedure hereinabove described or the shank portion may be otherwise lasted as by means of staples.

After carrying out the lasting procedure described herein the shoe is ready for further shoemaking operations. An outsole may be attached in the manner disclosed in my copending application, Serial No. 401,925, filed on even date herewith.

Having described my invention, what I claim as new and desire to secure by Letters Patent of the United States is:

1. The method of lasting to an insole a shoe upper having a lasting marginal portion composed of vinyl resin, which comprises providing a coat of chlorinated rubber on the inner surface of the overlasted marginal portion thereof, and securing said coated surface to said insole by means of a lasting cement the primary adhesive constituent of which is from the group consisting of rubber and polymerized chloroprene.

2. The method of lasting a shoe upper having a lasting marginal portion composed of vinyl resin to an insole secured to a last, which comprises shaping said upper to the last, holding said upper in shaped position, securing a film of chlorinated rubber to the inner surface of the overlasted marginal portion of said upper, and securing said overlasted marginal portion to said insole by means of a lasting cement the adhesive constituent of which is from the group consisting of rubber and polymerized chloroprene.

3. The method of lasting a shoe upper having a lasting marginal portion composed of vinyl resin to an insole secured to a last, which comprises shaping said upper to the last, holding said upper in shaped position, applying a solution of chlorinated rubber to the inner surface of the overlasted marginal portion of said upper, permitting said solution to dry, applying a liquid dispersion of polymerized chloroprene to the dried chlorinated rubber on said inner surface and to the adjacent lasting marginal portion of the insole, and pressing said marginal portion of the upper to the marginal portion of the insole with their polymerized chloroprene-coated surfaces in juxtaposition.

4. The method of lasting a shoe upper having a lasting marginal portion composed of vinyl resin to an insole secured to a last, which comprises shaping said upper to the last, holding said upper in shaped position, applying a solution of chlorinated rubber to the inner surface of the overlasted marginal portion of said upper, permitting said solution to dry, applying a solution of rubber containing a tackiness-augmenting resin to the dried chlorinated rubber on said inner surface of the overlasted marginal portion of said upper and to the adjacent lasting marginal portion of the insole, and pressing said marginal portion of the upper to the marginal portion of the insole with their rubber-coated surfaces in juxtaposition.

5. In a shoe, an upper having a lasting marginal portion composed of vinyl resin, a film of chlorinated rubber on the inner surface of the overlasted marginal portion of said upper, an insole, and a lasting cement the adhesive constituent of which is from the group consisting of rubber and polymerized chloroprene adhesively securing said overlasted marginal portion of the upper to the adjacent marginal surface of said insole.

FREDERICK V. NUGENT.